United States Patent
Chiang et al.

(10) Patent No.: US 7,920,901 B2
(45) Date of Patent: Apr. 5, 2011

(54) SYSTEM AND METHOD FOR PROVIDING VISUAL INDICATORS IN A MEDIA APPLICATION

(75) Inventors: Hui-Yu Chiang, Burnaby (CA); Sherryl Lee Lorraine Scott, Toronto (CA); Alen Mujkic, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 1070 days.

(21) Appl. No.: 11/679,956

(22) Filed: Feb. 28, 2007

(65) Prior Publication Data

US 2008/0205205 A1 Aug. 28, 2008

(51) Int. Cl.
*H04B 1/38* (2006.01)

(52) U.S. Cl. ........ 455/566; 709/201; 709/206; 709/219; 709/229; 455/550.1

(58) Field of Classification Search ............... 455/550.1, 455/41.2, 41.3, 414.1, 414.2, 414.3, 3.04, 455/3.06, 566; 709/201, 206, 219, 229
See application file for complete search history.

(56) References Cited

U.S. PATENT DOCUMENTS

| | | | | |
|---|---|---|---|---|
| 6,728,729 B1 * | 4/2004 | Jawa et al. | ............................. | 1/1 |
| 6,965,770 B2 * | 11/2005 | Walsh et al. | ............... | 455/426.1 |
| 7,216,008 B2 * | 5/2007 | Sakata | ............................. | 700/94 |
| 7,281,214 B2 * | 10/2007 | Fadell | ............................. | 715/745 |
| 7,406,294 B1 * | 7/2008 | Liu | ............................. | 455/3.06 |
| 7,421,305 B2 * | 9/2008 | Burges et al. | ............................. | 700/94 |
| 7,693,535 B2 * | 4/2010 | Dunko | ............................. | 455/518 |
| 7,702,279 B2 * | 4/2010 | Ko et al. | ............................. | 455/3.06 |
| 7,720,929 B2 * | 5/2010 | Morohashi | ............................. | 709/213 |
| 7,725,494 B2 * | 5/2010 | Rogers et al. | ............................. | 707/802 |
| 2004/0027931 A1 | 2/2004 | Morita | | |
| 2004/0210593 A1 | 10/2004 | Hirano | | |
| 2004/0242269 A1 * | 12/2004 | Fadell | ............................. | 455/556.2 |
| 2006/0156239 A1 * | 7/2006 | Jobs et al. | ............................. | 715/727 |

FOREIGN PATENT DOCUMENTS

| | | |
|---|---|---|
| EP | 1624387 | 2/2006 |
| EP | 1750267 | 2/2007 |
| GB | 2364430 | 1/2002 |

* cited by examiner

*Primary Examiner* — Edward Urban
*Assistant Examiner* — RuiMeng Hu
(74) *Attorney, Agent, or Firm* — Ogilvy Renault LLP

(57) ABSTRACT

A method is provided for providing a visual indicator of content existing in a play list while displaying available media items for adding to the play list. The method comprises the steps of: retrieving information related to the available media items; retrieving information related to the content existing in the play list; comparing the available media item information with the play list content information to determine items from the available media that are already included in the play list; displaying a menu showing the available media items; and displaying visual indicators next to the items in the menu of the available media that are already included in the play list.

20 Claims, 6 Drawing Sheets

SYSTEM AND METHOD FOR PROVIDING VISUAL INDICATORS IN A MEDIA APPLICATION

TECHNICAL FIELD

The present disclosure relates generally to portable devices, and more particularly to a system and method for providing visual indicators in a media application on a portable device.

BACKGROUND

Users of media applications on personal computers and wireless devices are accustomed to using play lists organized by the media applications to organize connections of music files that they wish to listen to. Recently, the collections of music that can be included on a play list have grown substantially in size because storage devices such as hard drives and memory cards have become much larger and more affordable. Unfortunately, editing play lists is an increasingly cumbersome task because the user does not necessarily know what music is already in the play list when navigating lists of available media in an attempt to add to the contents of the play list. This can result in duplicate songs being added to a play list or the user attempting to add duplicate songs. This is a waste of time and uses unnecessary computing resources on wireless devices such as processing and battery power.

Accordingly, it would be desirable to have a system and method for providing visual indicators in a media application that serves to provide a more user friendly interface for users of media applications, such that play lists can be quickly and efficiently edited and/or added to.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

In one aspect of the presently described subject matter, a method is provided for providing a visual indicator of content existing in a play list while displaying available media items for adding to the play list. The method comprises the steps of: retrieving information related to the available media items; retrieving information related to the content existing in the play list; comparing the available media item information with the play list content information to determine items from the available media that are already included in the play list; displaying a menu showing the available media items; and displaying visual indicators next to the items in the menu of the available media that are already included in the play list.

Another aspect of the presently described subject matter provides a system for providing a visual indicator of content existing in a play list on a wireless device while displaying available media items for adding to the play list. The wireless device comprises: a microprocessor for controlling the operation of the wireless device; a first input device coupled to the microprocessor for accepting an input from a user of the wireless device; a display device coupled to the microprocessor for communicating an output to the user; a communications subsystem coupled to the microprocessor for communicating with a communications network; and a memory coupled to the microprocessor. The system includes a media player module resident in the memory for execution by the microprocessor. The media player module is configured to: retrieve information related to the available media items; retrieve information related to the content existing in the play list, media files referenced by the content existing in the play list residing in the memory; compare the available media item information with the play list content information to determine items from the available media that are already included in the play list; display on the display device a menu showing the available media items; and display on the display device visual indicators next to the items in the available media that are already included in the play list.

Figure 1:
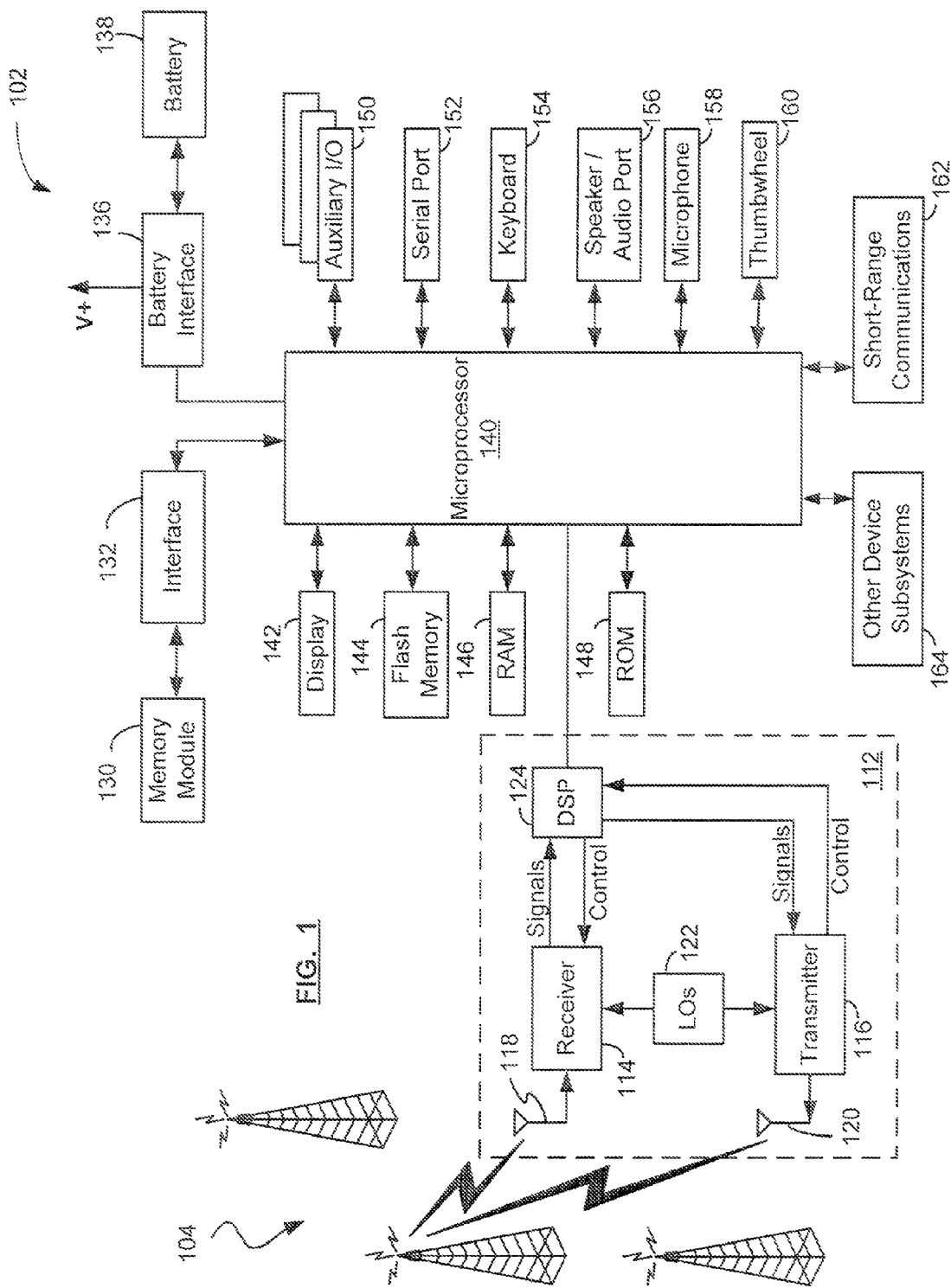
FIG. 1 shows in block diagram form a wireless device suitable for running a media application in accordance with one embodiment.

Reference is first made to FIG. 1, which shows a block diagram illustrating a portable wireless device 102 suitable for running a media application in accordance with one embodiment of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which, controls the overall operation of the wireless device 102. Communication functions, including, at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a data port such as serial port 152, a keyboard or keypad 154, a speaker or audio port 156 for connecting to, for example a set of headphones, a microphone 158, a clickable thumbwheel or thumbwheel 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. The wireless device 102 may also include a media player application for playing media files such as video files (e.g., .VOB, .AVI, .WMB, or .MPG), audio flies (e.g., .MP2, .MP3, .MP4, .AAC, .WAV), or any other type of media file known to those skilled in the art. Naturally, one or more memory stores are available on the wireless device 102 to facilitate storage of media file data items and other information, such as the flash memory 144, the RAM 146, the ROM 148, the memory module 130, or other types of memory storage devices or memory cards represented by the other device subsystems 164.

The PIM and/or media applications have the ability to send and receive data items via either the wireless network 104 or a link to a desktop computer system. The link to the desktop computer system may be via the serial port 152 or the short-range communications subsystem 162. In one embodiment, PIM and/or media data items are seamlessly combined, synchronized, and updated via the wireless network 104, with the wireless device user's corresponding data items stored and/or associated with a host computer system thereby creating a mirrored or partially mirrored host computer on the wireless device 102 with respect to such items. This is advantageous where the host computer system is the wireless device user's office computer system. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel 160 in conjunction with the display 142 and possibly the auxiliary I/O device 150. The keypad 154 may be either a complete alphanumeric keypad or telephone-type keypad. These composed items may be transmitted through the communication subsystem 112 over the wireless network 104 or via the short range communication subsystem 162.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's desktop computer is a desirable, albeit optional, component. The serial port 152 enables a user to set preferences through an external device or software application and extends the capabilities of the wireless device 102 by providing for information, media file, or software downloads to the wireless device 102 other than through the wireless network 104. The alternate download path may, for example, be used to load media files onto the wireless device 102 through a direct, reliable and trusted connection to thereby provide the user of the device 102 with media files to view and/or listen to using a media application of the device 102.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b and/or 802.11g.

Figure 2:
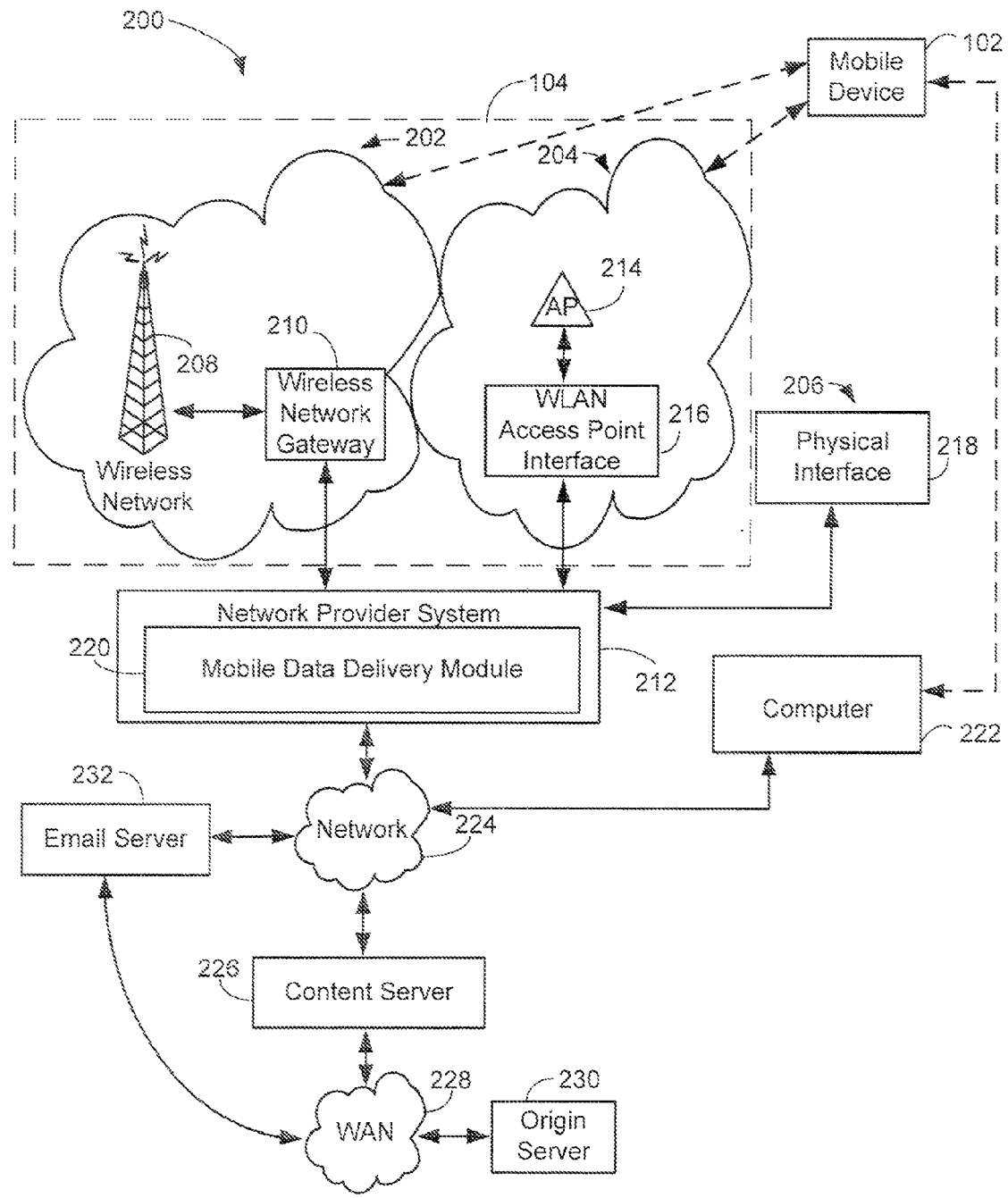
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more mobile electronic devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the mobile electronic devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the mobile electronic devices 102 and other devices (not shown) connected, directly or indirectly, to the network provider system 212.

The WLAN 204 comprises a network which in some examples conforms to IEEE 802.11 standards such as 802.11b and/or 802.11g; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the mobile electronic devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the mobile electronic device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the mobile electronic devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A desktop or laptop computer 222 belonging to the user of the mobile device 102 is typically connected to the enterprise network 224. As described earlier, the mobile device 102 can be temporarily and directly connected to the computer 222 using, for example, the serial port 152. Alternatively, the mobile device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224.

The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the mobile electronic devices 102.

Figure 3:
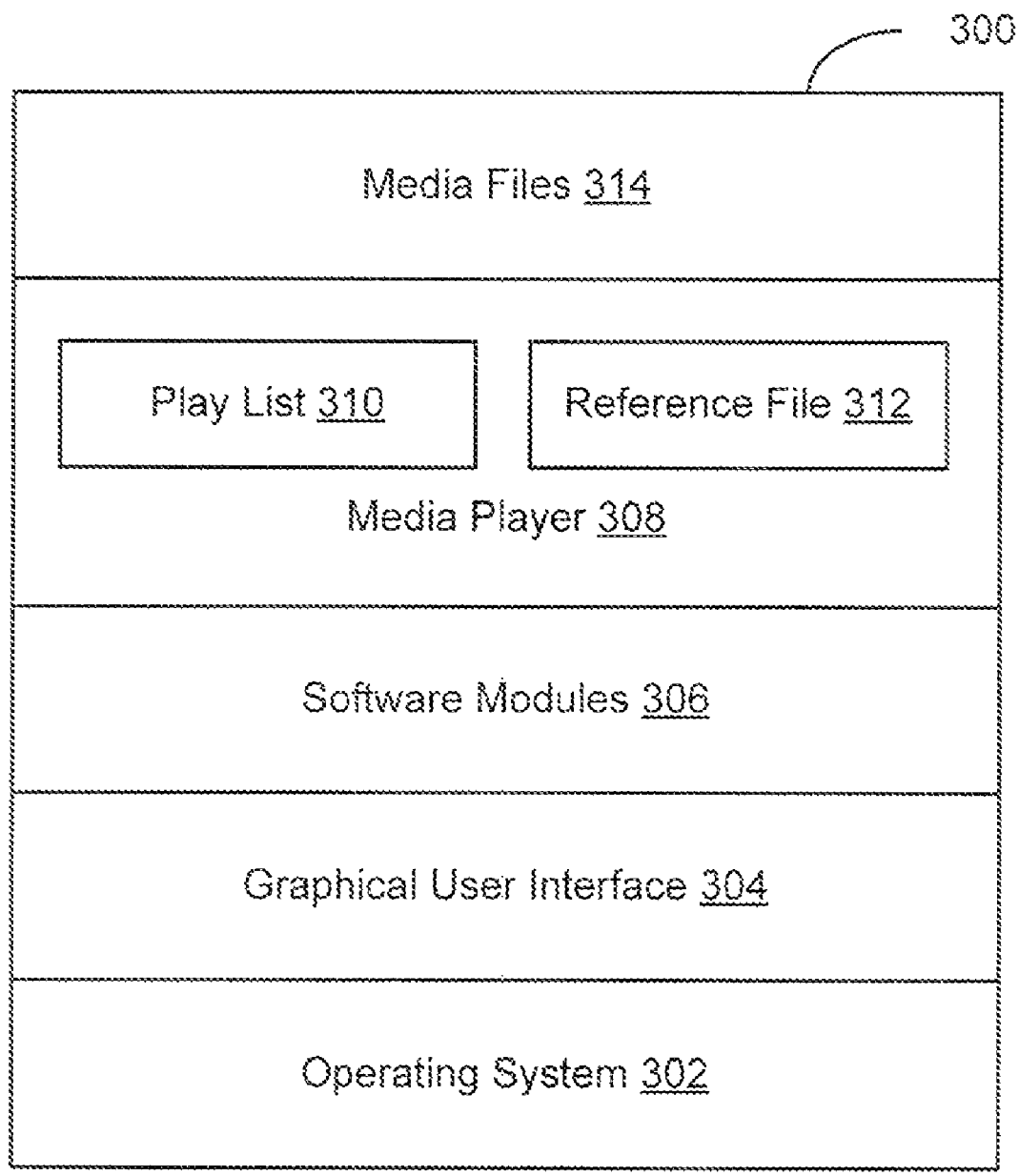
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is a portable media player intended to allow the user to listen to audio files and/or watch video files. In accordance with another embodiment, the wireless device 102 is intended to be a multi-tasking wireless communications device configured for sending and receiving data items and for making and receiving voice calls that also includes a media player application enabling the user to listen to audio and/or watch video. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306. The memory 300 also includes a media player application 308 for playing media files 314 that are stored in the memory 300. Typically, the media files 314 would be stored in the flash memory 144, but may be stored in any of the memory devices associated with the memory 300. The media player application 308 may further maintain in the memory 300 one or more play lists 310 and one or more reference files 312. In one embodiment, the play lists 310 are used by the media player application 308 to manage the playing of media selected from the media files 314, stored locally on the wireless device 102. In one embodiment, the reference file 312 is a list of media that is available from an external source, for example media stored on the user's computer 222, that may be selected for copying to the wireless device 102 and for adding to the media files 314.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
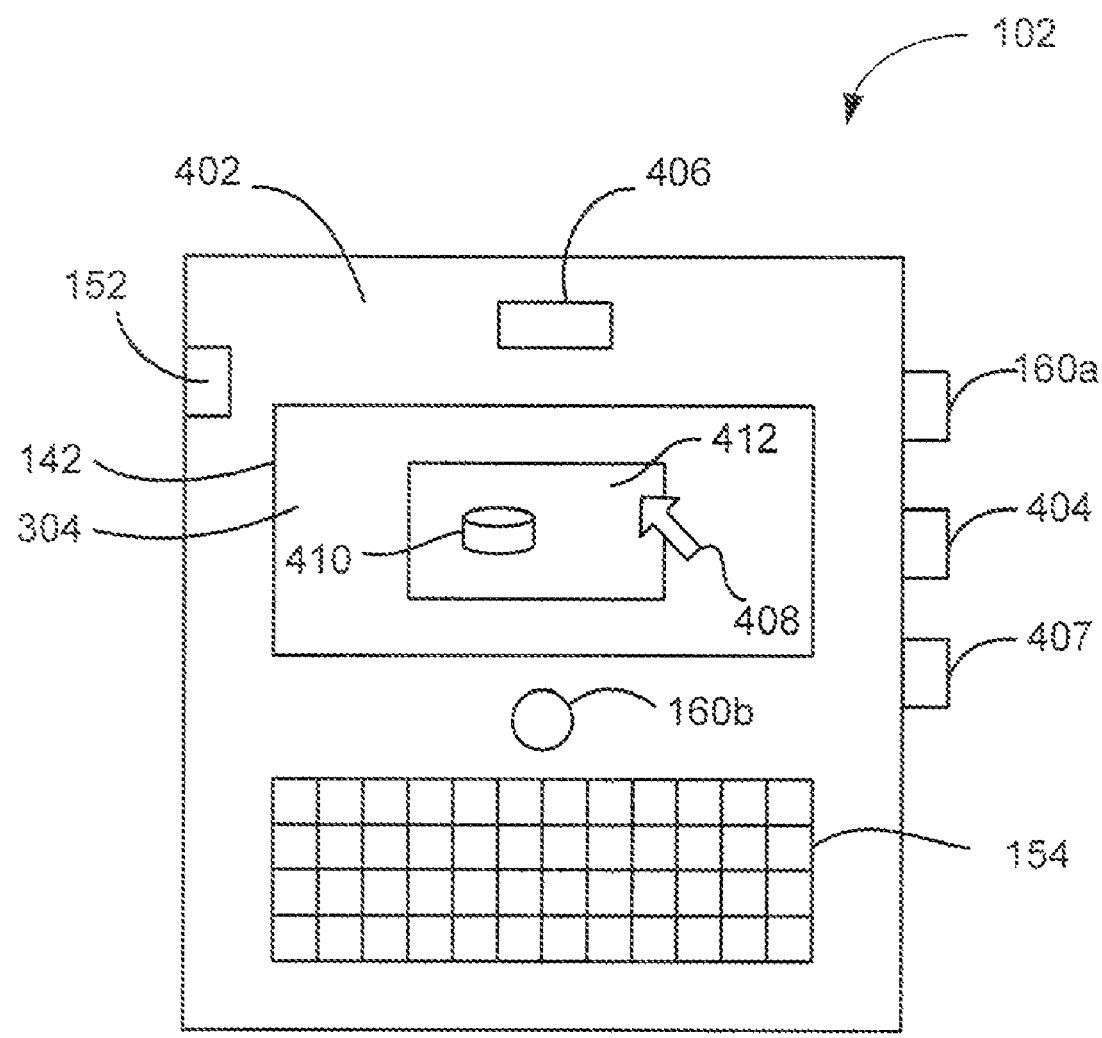
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel 160a or other device for navigation such as a trackball 160b, one or more input buttons 404 (e.g., select, cancel, talk, play, stop, fast forward, rewind, next, previous buttons), and signal inputs/outputs 406 (e.g., power connector input, microphone, speaker, data interface input, etc.), and an audio port 407. Internally, the wireless device 102 includes one or more circuit boards (not shown), the microprocessor 140 (FIG. 1), the memory 300 (FIG. 3), the battery 138 (FIG. 1) the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300. The microprocessor 140 is typically coupled to a set of stereo headphones connected to either the audio port 407 or connected via a Bluetooth connection when the user wishes to use the media player application 308 to listen to audio files and/or watch video files.

A user may interact with the wireless device 102 and its software modules 306 and the media player module 308 using the GUT 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing"

at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

Figure 5:
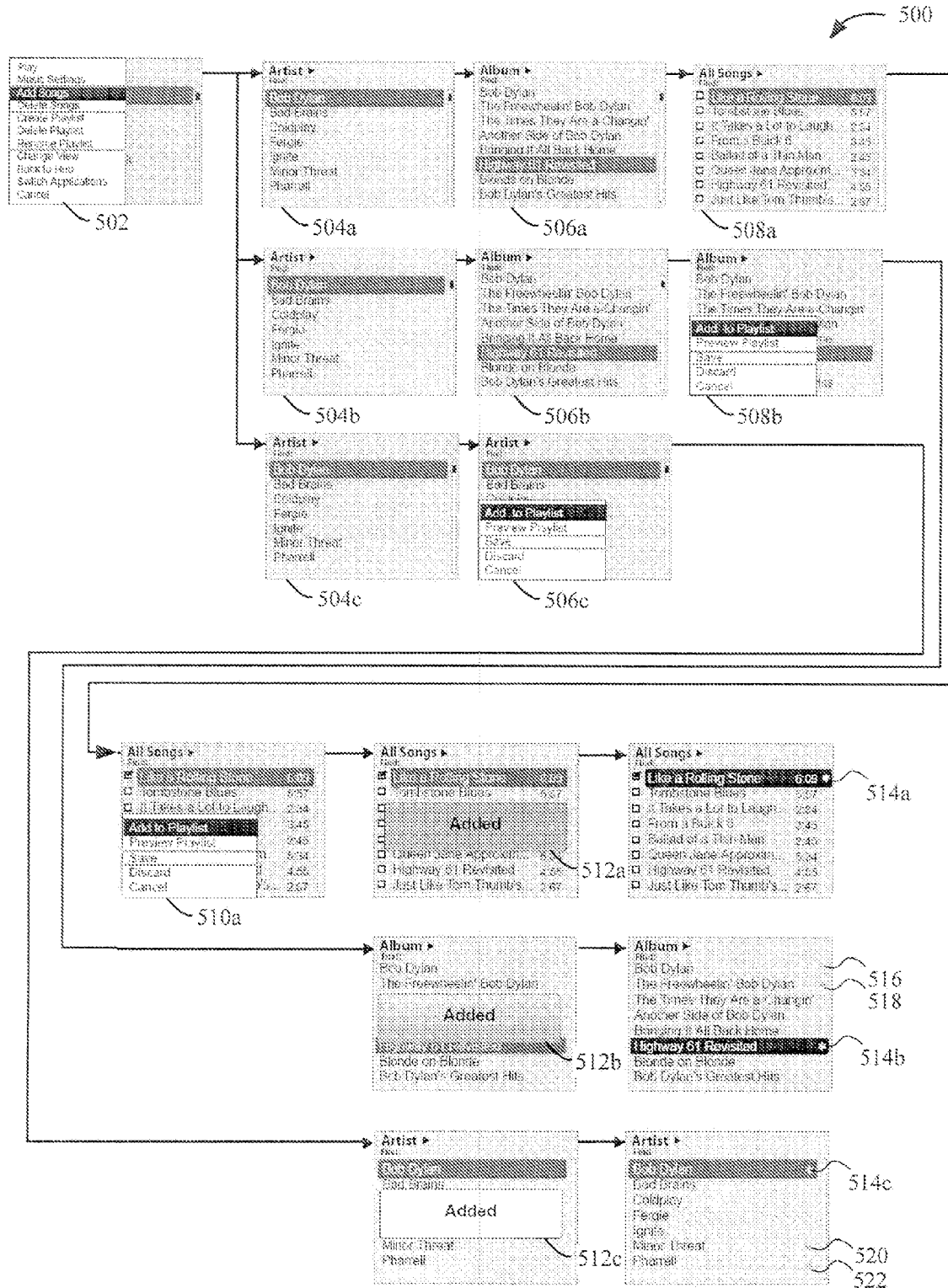
FIG. 5 is a work flow illustrating a series of screen images in accordance with one embodiment.

Reference is next made to FIG. 5, which shows a work flow 500 illustrating a user adding media files to the play list 310 of the media player application 308 in accordance with one embodiment. There are many ways of organizing media files in a hierarchical context that simplifies the navigation of media files stored on a computing device. For the purposes of the following examples, it is assumed that the media files comprise music files and that the music files are organized by the media player application 308 according to artist, then according to album, and then according to song. However, the work flow 500 is equally applicable to other types of media files such as video files, games, picture flies, etc. It will be understood by those skilled in the art that the media files may be any sort of media file, and that the media files could be organized according to any known method. Additionally, the method of organization of the media files by the media player application 308 may be changed or configured using settings within the media player application 308.

The media files that are available for download to the wireless device 102 are typically stored on the user's computer, such as the computer 222 shown in FIG. 1, or anywhere in the system 200 in a location that is made available to the user of the wireless device 102, such as on the network provider system 222. The media player application 308 may be configured to acquire a list of media available for download at predetermined times, such as when the wireless device 102 is connected to the computer 222 with a serial cable, and store the list of available media, for example in the memory 300 as the reference file 312. Alternatively, the media player application 308 may download a list of available media on demand at the request of the user, for example using the communication subsystem 112 and the WAN 202 or the short-range communications subsystem 162 and the WLAN 204, and store it as the reference file 312.

The work flow 500 illustrates the various menus and menu items encountered as the user of the wireless device 102 using the media player application 308 adds individual songs, albums, or entire collections belonging to a particular artist to the play list 310. The functions and menus described may be available on the wireless device 102 when the user enters a mode called, for example "manage play list". Once this mode is entered, a first menu 502 presents the options available with regards to the play list 310 existing within the media player application 308. Typically, the play list 310 will have been previously created by the user or the adding of content beginning with the first menu 502 may be a step in the process of creating a new play list. If the user chooses to add songs to the play list 310, the user chooses the "Add Songs" option in the menu 502. Next, the media player application 308 displays to the user the artists for which songs are available to be added to the play list (i.e., in the example where the songs are organized according to the artist/album/song hierarchy, as explained above), in a list 504. In one embodiment, the available songs are determined based on the content of the reference file 312.

For the purposes of illustration, the list 504 is shown 3 times, separately indicated as 504a, 504b, and 504c, in order to illustrate three different options that the user may choose to exercise next. In first and second options, if the user wishes to add specific artist songs such as "Bob Dylan" songs or albums to the play list 310, the user so indicates by selecting "Bob Dylan", for example by clicking on "Bob Dylan", and the media player application 308 displays a list of "Bob Dylan" albums available (e.g., the albums being available either partially or entirely), as shown in lists 506a and 506b. Alternatively, if the user wishes to add all "Bob Dylan" albums and/or songs available to the play list 310, the user so indicates, for example by using an appropriate button on the keypad 154 of the wireless device 102, and the media player application 308 displays a menu 506c that presents the user with the function "Add to Playlist" to add "Bob Dylan" to the play list 310. The user then indicates this selections. The action of indicating a selection, such as choosing the function "add to Playlist", or choosing "Bob Dylan", as described above, may be accompanied by the wireless device 102 playing a sound to indicate to the user that the selection has been made.

Returning to the first option and at the menu 506a, if the user wishes to see the songs available belonging to a particular album, the user so indicates, for example by selecting "Highway 61 Revisited", and the media player application 308 displays to the user a list of songs, indicated by numeral 508a. In the second option and at the menu 506b, if the user wishes to add all available songs belonging to the album "Highway 61 Revisited", the user so indicates and the media player application 308 displays a menu 508b that presents the user with the function "Add to Playlist" to add the album to the play list 310. The user then indicates this selection, which may again be acknowledged with a sound or media file played by the wireless device 102.

Returning to the first option and the menu 508a, if the user wishes to add a particular song, for example "Like a Rolling Stone", the user so indicates and the media player application 308 displays a menu 510a that presents the user with the function "Add to Playlist" to add the song to the play list 310. In all three cases (i.e., 506c, 508b, and 510a) the media player application 308 responds to the choice "Add to Playlist" from the menus 506c, 508b, and 510a by displaying a message "Added", illustrated by numerals 512a, 512b, and 512c. The media player application 308 may further specify where the media file that was added is currently located (e.g., on the computer 222, on the wireless device 102, or anywhere else in the system 200). The media player application 308 then displays an indicator, illustrated by numerals 514a, 514b, and 514c, to show that the respective song, album, or artist is part of the existing play list 310. Other indicators 516, 518, 520, and 522 show other songs, albums, or artists that are already part of the play list 310.

The indicators 514 serve an important function by indicating to the user what artists/albums/songs are already present in the play list 310. The indicator 514a is shown as present in a menu that is the same menu as the menu 508a and shows that the song "Like a Rolling Stone" is part of the play list 310 currently being edited. Similarly, the indicator 514b is shown as present in a menu that is the same menu as the menu 506b and shows that at least one song of the album "Highway 61 Revisited" is part of the play list 310 currently being edited.

Also, the indicator 514c is shown as present in a menu that is the same menu as the menu 504c and shows that one or more Bob Dylan songs are part of the play list 310 currently being edited.

In one embodiment, the indicator 514b may indicate that the entire Album "Highway 61 Revisited" is part of the play list 310 and the indicator 514c may indicate that all available "Bob Dylan" songs are part of the play list 310. However, in another embodiment, once any of the "Bob Dylan" songs available to be added to the play list 310, such as "Like a Rolling Stone", has been added to the play list 310, all indicators 514a, 514b, and 514c would appear in the menus 508a, 506b, and 504c, respectively. This embodiment has the advantage that a user choosing to add songs to the play list 310 would encounter the indicator 514c upon entering the menus 504 and would know that at least one "Bob Dylan" song already exists in the play list 310. If the user chooses to investigate further (e.g., perhaps wishing to add more "Bob Dylan" songs to the play list 310 or to see what "Bob Dylan" songs are already included in the play list 310), the user indicates "Bob Dylan" in the menu 504a and the media player application 308 displays, for example, the menu 506b, which would now include the indicator 514b. The indicator 514b informs the user that at least one song of the album "Highway 61 Revisited" is already included in the play list 310. At this point, the user could choose to revert back to the menu 504a, investigate or add another album shown in the menu 506a, or further investigate to see which songs of the Album "Highway 61 Revisited" are part of the play list 310. If the user chooses to investigate further (e.g., perhaps wishing to add more "Bob Dylan" songs from the album "Highway 61 Revisited" to the play list 310 or to see which "Bob Dylan" songs of the album "Highway 61 Revisited" are already included in the play list 310), the user so indicates in the menu 506a and the media player application 308 displays, for example the menu 508a, which now includes the indicator 514a. The indicator 514a informs the user that the song "Like a Rolling Stone" is already part of the play list 310 being edited, but also indicates that the other songs of the album "Highway 61 Revisited" not having the indicator 514a are not part of the play list 310.

The indicators 514a, 514b, and 514c that appear, for example in the menus 505a, 506b, and 504c after the song "Like a Rolling Stone" has been added to the play list, as described earlier, serve as an indicator trail giving the user of the media player application 308 an indication of what exists in the play list 310 while he is editing the play list 310. This enables a user who is navigating the menus 504a, 506a, and 508a to know what is already part of the play list 310) so that he does not waste time adding files to the play list 310 that are already part of the play list 310. Since the user interface displayed on the display 142 of the wireless device 102 is typically small, this serves to make the user interface of the media player application 308 easier to navigate. Additionally, this serves to save space in the memory 300 since duplication of existing songs is prevented. Further, since the user is likely to spend less time navigating through the media player application 308, the burden on the microprocessor 140 is lessened and less power is needed from the battery 138.

The indicators 514a, 514b, and 514c are all shown in FIG. 5 as being in the form of a star. In one embodiment, different types of indicators may be used to indicate different conditions or to convey different messages to the user of the media player application 308. For example, the indicator 514c may be a star to indicate that all available "Bob Dylan" songs are part of the play list 310 or the indicator 514c may take the form of a circle to indicate that only some of the available "Bob Dylan" songs are part of the play list 310. Similarly, the indicator 514b may be a star to indicate that all available songs from the album "Highway 61 Revisited" are part of the play list 310 or the indicator 514b may take the form of a square to indicate that only some of the available songs from the album "Highway 61 Revisited" are part of the play list 310, thus conveying the message to the user that more songs from the album "Highway 61 Revisited" could be added to the play list 310. In another example, the indicators may take a particular form to indicate where the song resides. For example, a green indicator could indicate that an available song resides on the user's computer 222 or a yellow indicator could indicate that the available song resides on another mobile device within a WIFI hotspot. Additionally, indicators (i.e., different indicators from the indicators 514a, 514b, and 514c) could be used to indicate the locations of available media files for adding to the play list 310 that have not yet been added to the play list 310. In yet another example, sound indicators could be used. For example, as the user scrolls through the available media, a sound may be played by the wireless device 102 when a song is encountered that is not on the play list 310, or conversely, a sound may be played as the user scrolls past those media selections that are already on the play list 310. Those skilled in the art, will appreciate that any number of indicators may be used to indicate any number of conditions.

Figure 6:
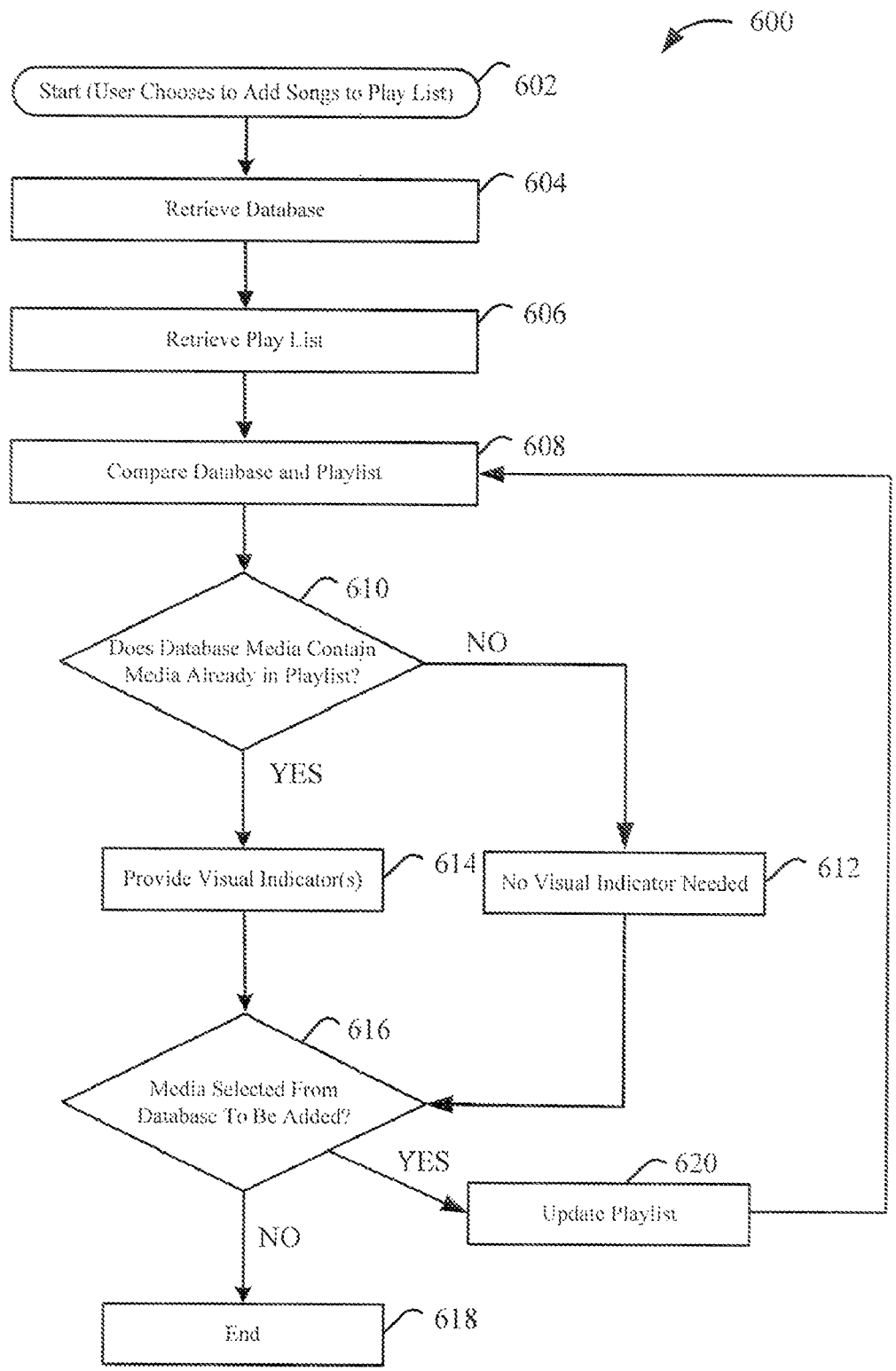
FIG. 6 is a flowchart illustrating a method of providing visual indicators in accordance with one embodiment.

Reference is next made to FIG. 6, which shows a method 600 of providing visual indicators in accordance with one embodiment. The method 600 is an example of a process that would be executed by the media player application 308 (FIG. 3) running on the microprocessor 140 (FIG. 1) while the user is in the process of adding songs to a play list 310, similar to what was described in connection with FIG. 5, described above. At a beginning step 602, the user chooses to enter the "manage play list" mode of the media player application 308 and to add songs to a play list, for example by choosing the "Add Songs" option in the menu 502 shown in FIG. 5. At a step 604, the media player application 308 then retrieves a collection of available song information, for example a database of available song information, which typically includes the artist, album, and song name, as well as other information that may optionally be included in the database such as song length, encoding bit rate, etc.

The database of available song information is typically stored on the wireless device 102, for example in the memory 300 as the reference file 312, and originates from the media files available from a remote location, such as on the computer or sever 222, other wireless devices in a WIFI hotspot, etc. The database of available song information is typically compiled by extracting the information from the available media files, for example from ID3 tags (i.e., either ID3v1 or ID3v2) in .MP3 files, APEv2, or other standards for storing metadata within the media files. As previously described, the available song information may be transferred to the wireless device 102 when the wireless device 102 is connected to the computer 222 with a serial cable. Alternatively, the media player application 308 may download a list of available media on demand at the request of the user, for example using the communication subsystem 112 and the WAN 202 or the short-range communications subsystem 162 and the WLAN 204. In one embodiment, the available media may be media available to be purchased and the user may be given the option of purchasing the media files when he adds them to his play list 310. Typically, once the media player application 308 has retrieved the available song information, the information is stored in the memory 300 for use, for example as the reference file 312. Therefore, the step 604 often involves loading the reference file 312 into the RAM 146 of the wireless device 102.

Next, at a step 606, the media player application 308 retrieves the data of the songs already in the play list 310 and already stored on the wireless device 102, for example in the memory 300 as the media files 314. This involves extracting the song information (for example, the ID3 tag information from .MP3 files) from the files of the songs in the play list 308, stored as the media files 314. At a step 608, the media player application 308 compares the song information of the media files 314 to the database of available songs (i.e., the reference file 312) and determines which available songs are already included in the play list 310. The comparison operation at step 608 operates according to the known principles of string (e.g., for artist name, album name, and song name) comparison and may include techniques for identifying media files that are included in the play list, but have slightly different metadata. This includes comparing metadata in a way that is not case sensitive, ignoring spaces and other characters that are not included in the alphabet (A-Z) or numbers (0-9), etc.

Next, at a step 610, the media player application 308 determines if the database of available media contains media already in the play list 310. If no available songs are included on the play list 310, no visual or audio indicators are needed in any of the menus (e.g., the menus 504, 506, 508), as shown by step 612. However, typically available songs will already be included in the play list 310 and the method 600 proceeds to a step 614. At the step 614, based on the results of the comparison performed at the steps 608 and 610, the media player application 308 provides visual indicators such as the visual indicators 514, 516, 518, and 520 shown in FIG. 5. The media player application 308 may also provide audio indicators, as described above. The media player application 308 may provide the indicators by compiling and storing a working file, for example in the RAM 146, that is used for keeping track of which available songs are already included in the play list 310. Based on this working file, the media player application 308 adds one or more indicators to the relevant menu, such as the indicator 514c to the menu 504c, indicating which artists have at least one song already existing on the play list 310 being edited. In another example, if the user is navigating the album menu 506a, the media player application 308 adds one or more indicators to the album menu 506a, such as the indicators 514b, 516, and 518, indicating which albums have at least one song already existing on the play list 310 being edited. In another example, if the user is navigating the song menu 508a, the media player application 308 adds one or more indicators to the song menu 508a, such as the indicator 514a, indicating which songs already exist on the play list 310 being edited.

Next, at a step 616, the method 600 determines whether songs have been added to the play list 310. If songs have not been added to the play list 310, the method terminates at a step 618. If songs have been added to the play list 310, the play list 310 is updated at a step 620 and the method returns to the step 608 where the comparison is performed again. The result of re-executing the comparison performed at the steps 608 and 610 is an updated working file to reflect the newly added songs to the play list 310, such that indicators will now appear in the artist menu 504a, the album menu 506a, and song menu 508a, next to the newly added songs belonging to the respective artists, albums, and songs.

The timing of the data transfer of the newly added songs to be added to the media files 314 of the memory 300 depends on the particular situation. In one embodiment, the newly added songs are queued to be copied from the computer or server 222 to the memory 300 the next time the wireless device 102 is physically connected to the computer 222, for example using a serial cable. In another embodiment, the newly added songs may be transferred to the wireless device 102 shortly after being added to the play list 310, for example using the communication subsystem 112 and the WAN 202 or the short-range communications subsystem 162 and the WLAN 204. Additionally, if the user has opted to purchase the newly added media, the wireless device 102 may facilitate the payment for purchase, for example by taking the user to a WEB site of a merchant offering the media for sale.

Additionally, the media player application 308 may be designed to handle media files that do not have proper metadata, such as older audio or video files not containing such metadata. In this case, the name of the selection may be the same as the filename, and, for example in the case of a music file, the artist and album title may be left blank, for inclusion under an "other" or "miscellaneous" category under the artist menu 504a or the album menu 506a.

While the present disclosure is primarily described as a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. Moreover, an article of manufacture for use with the apparatus, such as a prerecorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may elect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein, in the recited claims intends to cover and embrace all suitable changes in technology.

The invention claimed is:

1. A method for use on a portable wireless device for providing a visual indicator of content existing in a play list while displaying available media items for adding to the play list, the method comprising the steps of:
   retrieving over a wireless network to the portable wireless device information related to the available media items;
   retrieving information related to the content existing in the play list;
   comparing the available media item information with the play list content information to determine items from the available media that are already included in the play list;
   displaying a menu showing the available media items; and
   displaying visual indicators next to the items in the menu of the available media that are already included in the play list.

2. The method according to claim 1, wherein the play list is associated with a media player application on a wireless device and the available media is stored external to the wireless device.

3. The method according to claim 2, wherein the available media is stored on a computer and the information retrieved related to the available media items is transferred to the wireless device and stored in a file on the wireless device at a time when the wireless device is in communication with the computer.

4. The method according to claim 3, wherein the information retrieved related to the available media items is retrieved from metadata contained within files of the available media stored on the computer.

5. The method according to claim 2, wherein the content of the play list includes media files stored on the wireless device and the available media items include media files stored on a computer.

6. The method according to claim 5, wherein the step of retrieving information related to the content existing in the play list includes retrieving information from metadata within the media files stored on the wireless device.

7. The method according to claim 5, wherein the step of comparing the available media item information with the play list content information includes comparing artist, album, and song title information.

8. The method according to claim 2, further comprising the step of, before the step of displaying a menu showing the available media items:
    storing on the wireless device a working file indicating the items from the available media that are already included in the play list.

9. The method according to claim 1, wherein the step of displaying a menu showing the available media items includes displaying a list of artists whose songs are available and the step of displaying visual indicators next to items in the available media that are already included in the play list includes displaying visual indicators next to the artists of which at least one song is included in the play list.

10. The method according to claim 9, wherein the visual indicators include a first visual indicator if all available songs of an artist are included in the play list and a second visual indicator if less than all of the available songs of an artist are included in the play list.

11. The method according to claim 1, wherein the step of displaying a menu showing the available media items includes displaying a list of albums to which songs are available and the step of displaying visual indicators next to items in the available media that are already included in the play list includes displaying visual indicators next to the albums of which at least one song is included in the play list.

12. The method according to claim 11, wherein the visual indicators include a first visual indicator if all available songs of an album are included in the play list and a second visual indicator if less than all of the available songs of an album are included in the play list.

13. The method according to claim 1, wherein the step of displaying a menu showing the available media items includes displaying a list of media selections that are available and the step of displaying visual indicators next to items in the available media that are already included in the play list includes displaying visual indicators next to the media selections that are included in the play list.

14. A system for providing a visual indicator of content existing in a play list on a wireless device while displaying available media items for adding to the play list, the wireless device comprising:

a microprocessor for controlling the operation of the wireless device;
a first input device coupled to the microprocessor for accepting an input from a user of the wireless device;
a display device coupled to the microprocessor for communicating an output to the user;
a communications subsystem coupled to the microprocessor for communicating with a communications network; and
a memory coupled to the microprocessor;
the system including a media player module resident in the memory for execution by the microprocessor, the media player module being configured to:
retrieve over a wireless network information related to the available media items;
retrieve information related to the content existing in the play list, media files referenced by the content existing in the play list residing in the memory;
compare the available media item information with the play list content information to determine items from the available media that are already included in the play list;
display on the display device a menu showing the available media items; and
display on the display device visual indicators next to the items in the available media that are already included in the play list.

15. The system according to claim 14, wherein the play list is associated with the media player module and the available media is stored in files on a computer, the information retrieved related to the available media items being transferred to the wireless device and stored in the memory on the wireless device at a time when the wireless device is in communication with the computer.

16. The system according to claim 15, wherein the available media item information is retrieved from metadata within media files stored on the computer and the play list content information is retrieved from metadata within the media files residing in the memory.

17. The system according to claim 14, wherein displaying the menu showing the available media includes displaying a list of artists whose songs are available and displaying the visual indicators next to items in the available media that are already included in the play list includes displaying visual indicators next to the artists of which at least one song is included in the play list.

18. The system according to claim 14, wherein displaying the menu showing the available media includes displaying a list of albums to which songs are available and displaying the visual indicators next to items in the available media that are already included in the play list includes displaying visual indicators next to the albums of which at least one song is included in the play list.

19. The system according to claim 14, wherein displaying the menu showing the available media includes displaying a list of media selections that are available and displaying the visual indicators next to items in the available media that are already included in the play list includes displaying visual indicators next to the media selections that are included in the play list.

20. The system according to claim 14, wherein the available media and the play list content are selected from the group consisting of audio files, video files, music files, movie files, game files, and picture files.

* * * * *